United States Patent [19]
Johnson

[11] Patent Number: 5,624,015
[45] Date of Patent: Apr. 29, 1997

[54] INFINITELY VARIABLE POSITIVE GEAR RATIO TRANSMISSION

[76] Inventor: Neal C. Johnson, P.O. Box 841, Deer Lodge, Mont. 59722

[21] Appl. No.: 450,531

[22] Filed: May 25, 1995

[51] Int. Cl.$^6$ .................................................... F16D 31/04
[52] U.S. Cl. ................................................................ 192/61
[58] Field of Search ........................... 192/61; 418/21; 475/91

[56] References Cited

U.S. PATENT DOCUMENTS

| | | | |
|---|---|---|---|
| 1,777,103 | 9/1930 | Murray | 192/61 |
| 2,463,950 | 3/1948 | Carroll | 418/21 X |
| 2,645,901 | 7/1953 | Elkins | 192/61 X |
| 2,645,903 | 7/1953 | Elkins | 192/61 X |
| 2,887,960 | 5/1959 | Tobias | 418/21 |
| 3,110,265 | 11/1963 | Miller | 418/21 |
| 5,203,747 | 4/1993 | Warren | 418/21 X |
| 5,306,127 | 4/1994 | Kinney | 418/21 |

*Primary Examiner*—Rodney H. Bonck

[57] ABSTRACT

A high efficiency transmission having infinitely variable positive gear ratios in forward and reverse directions is disclosed. The preferred embodiment of the transmission comprises a driven housing, an output shaft, a control shaft, a plurality of internal gears and collars constituting an infinitely variable displacement fluid escape system, and a plurality of gears constituting a fixed displacement fluid gear pump.

3 Claims, 1 Drawing Sheet

INFINITELY VARIABLE POSITIVE GEAR RATIO TRANSMISSION

BACKGROUND OF THE INVENTION

This invention relates to the field of rotary transmissions and more particularly to the field of variable gear ratio transmissions. This invention does provide an infinite number of forward gear ratios up to unity and a neutral ratio and an infinite number of gear ratios in a reverse direction. This transmission is adapted to use with a clutch mechanism if necessary. Once a gear ratio and direction are selected with the single control mechanism the transmission will maintain that ratio regardless of load changes. The unique design of this transmission allows achievement of maximum efficiency at higher operational speeds as heat and frictional energy losses decrease. This invention is suitable for most applications where input and output speed and torque is required to be variable.

Prior to the present invention no device particularly adapted to the modulation of speeds between an input force and an output force had the combined advantages of; achieving forward and neutral and reverse gear ratios utilizing the same rotating components, light weight, ease of construction, minimum number of components, increasing efficiency as operating speeds escalate and stability of selected gear ratios. Until this invention other devices were unable to provide forward, neutral and reverse gear ratios without utilizing a clutching system and additional components or were confined to low operating speeds due to mechanical inefficiencies caused by high frictional forces and subsequent heat generation. Prior devices are not easily adaptable to different applications such as vehicle transmissions or mechanical equipment drives.

OBJECTS OF THE INVENTION

A primary object of this invention is to provide a transmission having an infinitely variable gear ratio which includes forward, neutral and reverse gear ratios.

Another primary object of this invention is to provide such a transmission whose gear ratios will not vary with load or temperature changes once said gear ratios have been set by operator.

DESCRIPTION OF THE PREFERRED EMBODIMENT

Figure 1:
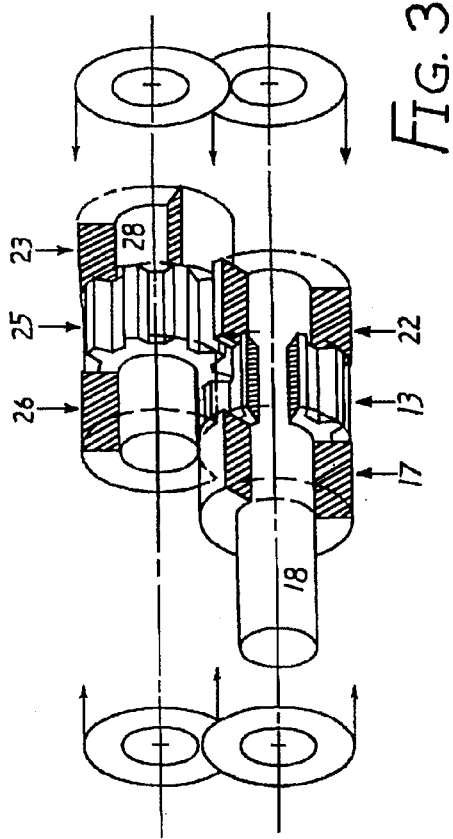
FIG. 1 is a sectional view of the main transmission housing which encloses the variable displacement mechanism.
Figure 2:
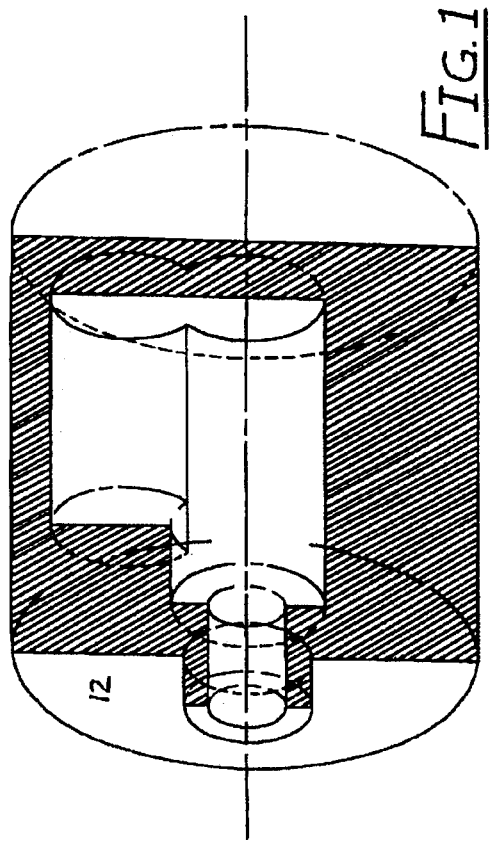
FIG. 2 is a cut-away schematic of the secondary portion of the main transmission housing which is shown enclosing a gear pump and from which the output shaft extends.
Figure 3:
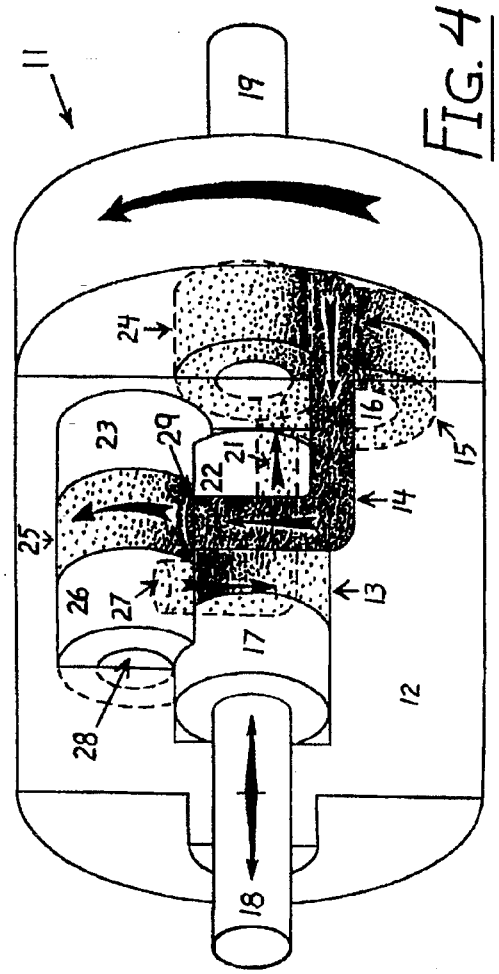
FIG. 3 is a cut-away schematic of a variable fluid displacement mechanism.
Figure 4:
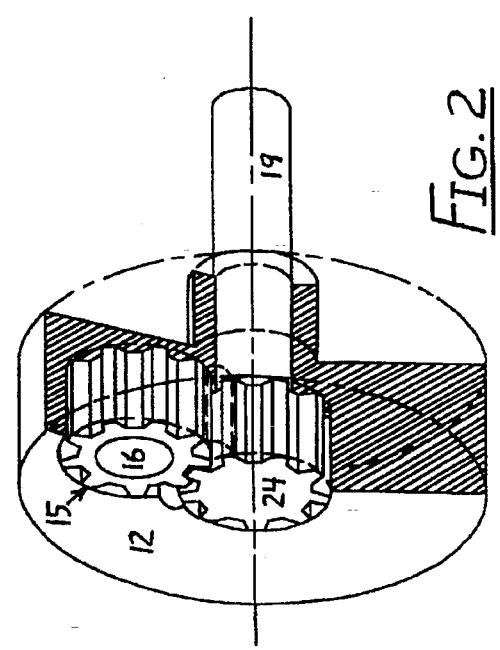
FIG. 4 is a simplified cut-away schematic showing the motion and assembly relationships of all constituent parts.

Referring to the drawings wherein like numerals designate like parts throughout the several views, the illustrated transmission designated (11) is shown in FIG. 4 as a simplified schematic, FIG. 1 shows the main portion of the transmission housing, FIG. 2 shows the secondary portion of the transmission housing which also displays the gear motor and output shaft components and FIG. 3 shows the component parts of the variable fluid displacement mechanism.

With reference now to the transmission (11) that includes a housing (12) which is of split construction and fixedly combined and includes inner chamber bores enclosing in a fluid tight manner the rotor assembly (23,25,26, and 28) and the stator assembly (13,17,18 and 22) of the variable fluid displacement mechanism. At opposing longitudinal end of housing (12) from said variable fluid displacement mechanism are chamber bores to incorporate a gear pump (15,16, 19 and 24). The maximum fluid displacement capacity of gears 15 and 24 is less than the maximum fluid displacement of gears 13 and 25. The smaller fluid displacement of gears 15 and 24 is derived by making said gears either smaller in diameter or shorter from front to back than gears 13 and 25. The complete housing (12) as shown in FIG. 4 is supported in a rotational manner about the longitudinal axis of control shaft (18) and output shaft (19). Referring to FIGS. 2 and 4 said gear pump (15,16,19 and 24) is fitted within bore chambers in a fluid tight manner. Gear (24) is fixedly attached to output shaft (19) which rotates within and extends from housing (12). Gear (15) intermeshes with gear (24) and rotates about trunion (16). Fluid driven by said gears (15 and 24)is circulated through and along passageways (14 and 21) and ports (27 and 29) within housing (12) as it is directed to said rotor assembly (23,25,26 and 28) and said stator assembly (13, 17, 18 and 22). Referring to FIG. 3 said rotor assembly (23,25,26 and 28) is comprised of stub shaft (28) around which is fixedly mounted collar (23), rotationally mounted gear (25) and fixedly mounted collar (26). Said collar (23) is cylindrically shaped and of the same external dimension as said gear (25) and said collar (26). Said collar (26) incorporates a semi-circular cut in its outer dimension and parallel to its longitudinal axis. Said cut is of same surface arc as the outer surface of collar (17) of said stator assembly (13, 17, 18 and 22). Said rotor assembly (23,25,26 and 28) is enclosed within bore chamber in said housing (12) in a fluid tight manner such that only a portion of said assembly's longitudinal surface is exposed to and drivingly engages in a parallel manner said stator assembly (13, 17, 18 and 22). Said stator assembly (13,17,18 and 22) has control shaft (18) on which is fixedly attached said collar (17), fixedly attached gear (13) and rotationally mounted collar (22) which has a semi-circular cut in its outer surface along longitudinal axis and engaging said collar (23). Control shaft (18) moves only longitudinally along its axis with regard to housing (12) and as regulated in a particular manner not critical to this invention.

OPERATION OF THE PREFERRED EMBODIMENT

In order to obtain useful output from the transmission (11) a rotary power source is connected to the transmission housing (12) and a load is attached to output shaft (19). As the rotational force is applied to the transmission housing (12) the load will tend to keep the output shaft (19) immobile. This will pressurize the working fluid on one side of the gear pump (15,16, and 24) attached to the output shaft (19). In FIG. 4 the pressurized fluid is shown as a heavily shaded area and the unpressurized fluid is a lighter shade. The pressurized fluid is directed to the rotor and stator assemblies through passageway (14) in the transmission housing (12). The passageway (14) opens into the confluence of the variable fluid displacement gears (13,25) at port (29). The high pressure fluid creates resistance within the transmission (11) when the fluid displacement of the stator (13) and rotor (25) gears is less than the fluid displacement capacity of gear pump (15,24) on output shaft (19). The resistance will cause the output shaft (19) to follow the transmission housing (12)

at a rate predetermined by the amount of fluid released through the variable fluid displacement unit (23,25,26,28,13, 17, 18 and 22). As the pressurized fluid is directed into said displacement unit it is carried around the outside of gears (13 and 25) to the point where said gears intermesh on the opposite side at port (27). The fluid is then recirculated through passageway (21) back to the low pressure side of said gear pump (15, 16,24 and 19) where the entire cycle repeats. Changes in output shaft (19) speed are accomplished through the stator assembly (13,17,18 and 22). The control shaft (18) is free to move longitudinally along its axis in a fluid tight manner in and out of the transmission housing (12). The two collars (17 and 22) and gear (13) also move longitudinally with the control shaft (18). The longitudinal movement serves to increase or decrease the amount of engagement between the rotor and stator gears (25 and 13). The amount of engagement determines the volume of working fluid displaced. The control shaft (18) is not allowed to rotate with transmission housing (12). Collar (17) and gear (13) are non-rotatably fixed to control shaft (18). As the rotor unit (23,25,26 and 28) is carried by the transmission housing (12) around the stator unit (13,17,18 and 22) the rotor gear (25) turns on stub shaft (28) allowing gears (13 and 25) to release the pressurized working fluid. Collars (23 and 26) are non-rotatably fixed to stub shaft (28). No parts of said rotor assembly move longitudinally along the axis of stub shaft (28). Referring to FIG. 4, collar (22) on control shaft (18) and collar (26) on stub shaft (28) have a semicircular cut in them parallel to the axis to allow for fluid tight clearance of gears (13 and 25) and collars (17 and 23) as control shaft (18) is moved laterally in and out of transmission housing (12). Fluid pressure must be maintained through close machined tolerances between moving parts. The shape, size and location of the collars act to prevent the loss of fluid from the gears as the collars pass over the gear teeth surfaces. At the same time the collars seal the sides of the gears. In full neutral position with the output shaft (19) not turning the displacement gears (13 and 25) are engaged to the position necessary to displace the same volume of fluid as the output shaft gear motor (15,16 and 24). In full speed position with the output shaft (19) rotating at the same rate as housing (12) the displacement gears (13 and 25) are completely disengaged from each other. Reverse in the transmission (11) is achieved by increasing the fluid displacement by fully engaging them of gears (13 and 25) to exceed the displacement of gears (15 and 24). The variable displacement gears (13 and 25) will then act as a conventional gear pump and drive the output shaft (19) backward at a rate exceeding the forward rotation of housing (12). The constituent parts of transmission (11) are shown at a minimum for ease of understanding. In actual practice it would be reasonable to construct this transmission (11) with a plurality of rotor assemblies (23,25,26 and 28) working about a common stator assembly ((13, 17, 18 and 22) to spread fluid loads. Additional gears (15) and trunions (16) would also be used about the output shaft gear (24). Maximum hydraulic drag would occur in the neutral and low speed operation as the working fluid is circulated at its most rapid rate. The transmission (11) would gain efficiency as the output shaft (19) speed increases.

What is claimed:

1. A continuously variable gear ratio transmission comprising a fluid tight housing supported for rotation about a longitudinal axis, said housing defining a plurality of bore chambers;

an output shaft rotatable within and extending from said housing and having a first gear fixedly attached;

a second gear rotatable about a trunion and contained within a fluid tight bore chamber in said housing and intermeshed with said adjacent first gear for rotation in opposite directions defining a gear pump;

a control shaft slideable along its axis and forming the longitudinal axis of said transmission and extending through said housing at an end longitudinally opposite of said output shaft;

a first collar non-rotatably fixed around said control shaft;

a second collar rotatably mounted around said control shaft and having a semi-circular cut through the outer dimension of said second collar along the longitudinal axis;

a third gear non-rotatably fixed around said control shaft and attached in a fluid tight manner between said rotating second collar and said non-rotating first collar;

an internal stub shaft secured within a bore chamber to prevent movement of said shaft along the longitudinal axis and mounted parallel to the longitudinal axis of said control shaft;

a third collar non-rotatably fixed around said stub shaft;

a fourth collar non-rotatably fixed around said stub shaft and having a semi-circular cut through outer dimension of said fourth collar along the longitudinal axis;

a fourth gear rotatably mounted around said stub shaft in a fluid tight manner between said non-rotating third and fourth collars;

a fluid tight passageway to conduct a working fluid from a fluid discharge area of intermeshing said first and second gears to a fluid inlet area of a variable intermeshing said third and fourth gears;

a fluid tight passageway to conduct said working fluid from a fluid discharge area of the variable intermeshing said third and fourth gears to a fluid inlet area of intermeshing said first and second gears.

2. A transmission as defined in claim 1, wherein said transmission contains a variable fluid regulating assembly comprised of said control shaft, fitted with said first and second collar and said third gear, is contained within said transmission housing in a central axially located fluid tight bore chamber of such length that full movement of the control shaft axially within said bore chamber does not exceed the length of said third gear;

wherein said internal stub shaft, affixed with said third and fourth collar and said fourth gear, is located within a fluid tight bore chamber which intersects in a parallel manner the bore chamber containing said control shaft;

wherein said third gear and said fourth gear are engaged in a constant state of intermesh which is variable through the axial movement of said control shaft;

wherein all rotating tooth surfaces of the said third and fourth gears are sealed from fluid leakage by the side surfaces and semi-circular cut surfaces of said, first, second, third and fourth collars.

3. A transmission as defined in claim 2 wherein said transmission housing is drivingly rotated in its entirety and said working fluid is circulated through said passageways, said variable fluid regulating assembly eliminating the need for any regulating valves in changing the speed and direction of said output shaft.

* * * * *